(12) United States Patent
Sloane et al.

(10) Patent No.: US 12,381,743 B2
(45) Date of Patent: Aug. 5, 2025

(54) SYSTEMS AND METHODS FOR GENERATING AND MONITORING NON-FUNGIBLE TOKEN RIGHTS IN A DISTRIBUTED NETWORK

(71) Applicant: BANK OF AMERICA CORPORATION, Charlotte, NC (US)

(72) Inventors: Brandon Sloane, Indian Land, SC (US); Lauren Jenae Alibey, Charlotte, NC (US); Sophie Morgan Danielpour, Durham, NC (US); Jinyoung Nathan Kim, Charlotte, NC (US); James Thomas MacAulay, Erie, CO (US); Serge Alejandro Neri, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 432 days.

(21) Appl. No.: 17/723,526

(22) Filed: Apr. 19, 2022

(65) Prior Publication Data
US 2023/0336364 A1    Oct. 19, 2023

(51) Int. Cl.
H04L 9/32    (2006.01)

(52) U.S. Cl.
CPC .......... *H04L 9/3263* (2013.01); *H04L 9/3213* (2013.01); *H04L 9/3236* (2013.01); *H04L 9/3247* (2013.01)

(58) Field of Classification Search
CPC ... H04L 9/3263; H04L 9/3213; H04L 9/3236; H04L 9/3247
See application file for complete search history.

(56) References Cited

U.S. PATENT DOCUMENTS

| | | | |
|---|---|---|---|
| 10,176,308 | B2 | 1/2019 | Mintz et al. |
| 11,075,891 | B1 * | 7/2021 | Long ............ H04L 9/3213 |
| 11,126,698 | B2 | 9/2021 | Vaish et al. |
| 2017/0116693 | A1 | 4/2017 | Rae et al. |
| 2017/0178128 | A1 | 6/2017 | Fourez et al. |
| 2017/0279774 | A1 | 9/2017 | Booz et al. |
| 2017/0331896 | A1 | 11/2017 | Holloway et al. |
| 2018/0025166 | A1 | 1/2018 | Daniel et al. |
| 2018/0089256 | A1 | 3/2018 | Wright, Sr. |
| 2018/0096175 | A1 | 4/2018 | Schmeling et al. |

(Continued)

*Primary Examiner* — Daniel B Potratz
*Assistant Examiner* — Faghia Telat Rana
(74) *Attorney, Agent, or Firm* — Moore & Van Allen PLLC; R. W. McCord Rayburn

(57) ABSTRACT

Systems, computer program products, and methods are described herein for generating and monitoring digital certificate rights in a distributed network. The present invention may be configured to receive a first request for certification of a first user, cause a first user device to display a first interface including one or more input fields for receiving information associated with the first user, receive data input by the first user to the one or more input fields of the first interface, and determine, based on the data, whether the first user satisfies requirements for the certification. The present invention may be configured to generate, based on determining that the first user satisfies the requirements for the certification, a non-fungible token certifying the first user, store the non-fungible token on a distributed ledger, and record, on the distributed ledger, the first user as owner of the non-fungible token.

20 Claims, 3 Drawing Sheets

(56) References Cited

U.S. PATENT DOCUMENTS

| | | |
|---|---|---|
| 2018/0117446 A1 | 5/2018 | Tran et al. |
| 2019/0229890 A1 | 7/2019 | Brehmer et al. |
| 2019/0273617 A1 | 9/2019 | Maher |
| 2019/0303623 A1 | 10/2019 | Reddy et al. |
| 2020/0401678 A1 | 12/2020 | Salomon |
| 2021/0035246 A1 | 2/2021 | Schouppe et al. |
| 2022/0058630 A1* | 2/2022 | Yantis ............... G06Q 20/326 |
| 2022/0222364 A1* | 7/2022 | Roberts ............... G06F 21/64 |
| 2023/0161847 A1* | 5/2023 | Shida ............... H04L 9/3236 726/26 |
| 2023/0198785 A1* | 6/2023 | Henning ............... G06Q 20/36 380/28 |

* cited by examiner

SYSTEMS AND METHODS FOR GENERATING AND MONITORING NON-FUNGIBLE TOKEN RIGHTS IN A DISTRIBUTED NETWORK

FIELD OF THE INVENTION

The present invention embraces systems and methods for generating and monitoring digital certificate rights in a distributed network.

BACKGROUND

An electronic system may be configured to generate digital certificates for a plurality of users. The electronic system may be configured to monitor the rights of each user of the plurality of users to the digital certificates.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for generating and monitoring digital certificate rights in a distributed network. The system may include at least one processing device, and at least one non-transitory storage device may include computer-executable program code that, when executed by the at least one processing device, causes the at least one processing device to receive, from a first user device associated with a first user, a first request for certification of the first user, cause, in response to receiving the first request, the first user device to display a first interface including one or more input fields for receiving information associated with the first user, and receive, from the first user device, data input by the first user to the one or more input fields of the first interface. The at least one non-transitory storage device may include computer-executable program code that, when executed by the at least one processing device, causes the at least one processing device to determine, based on the data, whether the first user satisfies requirements for the certification, generate, based on determining that the first user satisfies the requirements for the certification, a non-fungible token certifying the first user, store the non-fungible token on a distributed ledger, and record, on the distributed ledger, the first user as owner of the non-fungible token. The at least one non-transitory storage device may include computer-executable program code that, when executed by the at least one processing device, causes the at least one processing device to receive, from a second user device associated with a second user, a second request for information associated with at least one of the certification or the first user, determine, based on the second request and based on the distributed ledger, whether the first user owns the non-fungible token, and cause, based on determining that the first user owns the non-fungible token, the second user device to display a second interface including information confirming that the first user owns the non-fungible token.

In some embodiments, the first user may be an entity.

In some embodiments, the first interface may request entry, in the one or more input fields, of information identifying a source retainer associated with the first user, information identifying a government-provided unique identifier associated with the first user, information identifying one or more services previously performed by the first user, information identifying one or more certifications held by the first user, information identifying one or more licenses from one or more regulatory agencies held by the first user, information identifying one or more accounts associated with the first user, where the one or more accounts are associated with ratings of the first user provided by other users, information identifying government-provided rating associated with the first user, and/or the like.

In some embodiments, the first interface may request entry, in the one or more input fields, of information identifying a source retainer associated with the first user, and the at least one non-transitory storage device may include computer-executable program code that, when executed by the at least one processing device, causes the at least one processing device to determine, based on the information identifying the source retainer and based on other data stored in a data structure, a balance of resources in the source retainer and, when determining whether the first user satisfies the requirements for the certification, determine whether the balance of the resources in the source retainer satisfies a threshold. Additionally, or alternatively, the at least one non-transitory storage device may include computer-executable program code that, when executed by the at least one processing device, causes the at least one processing device to monitor the balance of the resources in the source retainer over time to determine whether the balance of the resources in the source retainer satisfies the threshold and record, on the distributed ledger and based on determining that the balance of the resources in the source retainer does not satisfy the threshold, a null owner as the owner of the non-fungible token. In some embodiments, the at least one non-transitory storage device may include computer-executable program code that, when executed by the at least one processing device, causes the at least one processing device to, after recording the null owner as the owner of the non-fungible token, continue to monitor the balance of the resources in the source retainer over time as compared to the threshold and record, on the distributed ledger and based on determining that the balance of the resources in the source retainer does satisfy the threshold, the first user as the owner of the non-fungible token. Additionally, or alternatively, the at least one non-transitory storage device may include computer-executable program code that, when executed by the at least one processing device, causes the at least one processing device to, after receiving the second request, determine, based on the information identifying the source retainer and based on the other data stored in the data structure, the balance of resources in the source retainer and record, on the distributed ledger and based on determining that the balance of the resources in the source retainer does not satisfy the threshold, a null owner as the owner of the non-fungible token.

In some embodiments, the at least one non-transitory storage device may include computer-executable program code that, when executed by the at least one processing device, causes the at least one processing device to determine, based on other data in one or more data structures, whether the data is accurate and, when determining whether the first user satisfies the requirements for the certification, determine whether the first user satisfies the requirements for the certification based on determining that the data is accurate. Additionally, or alternatively, the at least one non-transitory storage device may include computer-executable program code that, when executed by the at least one processing device, causes the at least one processing device to, when generating the non-fungible token certifying the first user, only generate the non-fungible token certifying the first user based on determining that the data is accurate.

In some embodiments, the second interface may include information confirming, for each requirement of the requirements for the certification, that the first user satisfies the requirement.

In some embodiments, the at least one non-transitory storage device may include computer-executable program code that, when executed by the at least one processing device, causes the at least one processing device to, when determining whether the first user satisfies the requirements for the certification, determine, based on the data and based on other data in a policy data structure, whether the first user satisfies the requirements for the certification, where the other data in the policy data structure includes records associating a plurality of users with a plurality of requirements for a plurality of certifications. Additionally, or alternatively, the other data in the policy data structure may include historical data indicating whether each user of the plurality of users has performed historical resource distributions satisfying a threshold, where the threshold may include a quantity of the historical resource distributions, a quantity of the historical resource distributions associated with a distribution of resources exceeding a predetermined amount, a rating from customers of the historical resource distributions, and/or the like. In some embodiments, the at least one non-transitory storage device may include computer-executable program code that, when executed by the at least one processing device, causes the at least one processing device to monitor the other data in the policy data structure over time to determine whether the first user satisfies the requirements for the certification and record, on the distributed ledger and based on determining that the first user does not satisfy the requirements for the certification, a null owner as the owner of the non-fungible token.

In another aspect, the present invention embraces a computer program product for generating and monitoring digital certificate rights in a distributed network. The computer program product may include a non-transitory computer-readable medium including code that, when executed by a first apparatus, causes the first apparatus to receive, from a first user device associated with a first user, a first request for certification of the first user, cause, in response to receiving the first request, the first user device to display a first interface including one or more input fields for receiving information associated with the first user, and receive, from the first user device, data input by the first user to the one or more input fields of the first interface. The computer program product may include a non-transitory computer-readable medium including code that, when executed by a first apparatus, causes the first apparatus to determine, based on the data, whether the first user satisfies requirements for the certification, generate, based on determining that the first user satisfies the requirements for the certification, a non-fungible token certifying the first user, store the non-fungible token on a distributed ledger, and record, on the distributed ledger, the first user as owner of the non-fungible token. The computer program product may include a non-transitory computer-readable medium including code that, when executed by a first apparatus, causes the first apparatus to receive, from a second user device associated with a second user, a second request for information associated with at least one of the certification or the first user, determine, based on the second request and based on the distributed ledger, whether the first user owns the non-fungible token, and cause, based on determining that the first user owns the non-fungible token, the second user device to display a second interface including information confirming that the first user owns the non-fungible token.

In some embodiments, the first user may be an entity.

In some embodiments, the first interface may request entry, in the one or more input fields, of information identifying a source retainer associated with the first user, information identifying a government-provided unique identifier associated with the first user, information identifying one or more services previously performed by the first user, information identifying one or more certifications held by the first user, information identifying one or more licenses from one or more regulatory agencies held by the first user, information identifying one or more accounts associated with the first user, where the one or more accounts are associated with ratings of the first user provided by other users, information identifying government-provided rating associated with the first user, and/or the like.

In some embodiments, the first interface may request entry, in the one or more input fields, of information identifying a source retainer associated with the first user, and the computer program product may include a non-transitory computer-readable medium including code that, when executed by a first apparatus, causes the first apparatus to determine, based on the information identifying the source retainer and based on other data stored in a data structure, a balance of resources in the source retainer and, when determining whether the first user satisfies the requirements for the certification, determine whether the balance of the resources in the source retainer satisfies a threshold. Additionally, or alternatively, the computer program product may include a non-transitory computer-readable medium including code that, when executed by a first apparatus, causes the first apparatus to monitor the balance of the resources in the source retainer over time to determine whether the balance of the resources in the source retainer satisfies the threshold and record, on the distributed ledger and based on determining that the balance of the resources in the source retainer does not satisfy the threshold, a null owner as the owner of the non-fungible token. In some embodiments, the computer program product may include a non-transitory computer-readable medium including code that, when executed by a first apparatus, causes the first apparatus to, after recording the null owner as the owner of the non-fungible token, continue to monitor the balance of the resources in the source retainer over time as compared to the threshold and record, on the distributed ledger and based on determining that the balance of the resources in the source retainer does satisfy the threshold, the first user as the owner of the non-fungible token.

In yet another aspect, a method for generating and monitoring digital certificate rights in a distributed network is presented. The method may include receiving, from a first user device associated with a first user, a first request for certification of the first user, causing, in response to receiving the first request, the first user device to display a first interface including one or more input fields for receiving information associated with the first user, and receiving, from the first user device, data input by the first user to the one or more input fields of the first interface. The method may include determining, based on the data, whether the first user satisfies requirements for the certification, generating, based on determining that the first user satisfies the requirements for the certification, a non-fungible token certifying the first user, storing the non-fungible token on a distributed ledger, and recording, on the distributed ledger, the first user as owner of the non-fungible token. The method may include receiving, from a second user device associated with a second user, a second request for information associated with at least one of the certification or the first user, determining, based on the second request and based on the distributed ledger, whether the first user owns the non-fungible token, and causing, based on determining that the first user owns the non-fungible token, the second user device to display a second interface including information confirming that the first user owns the non-fungible token.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
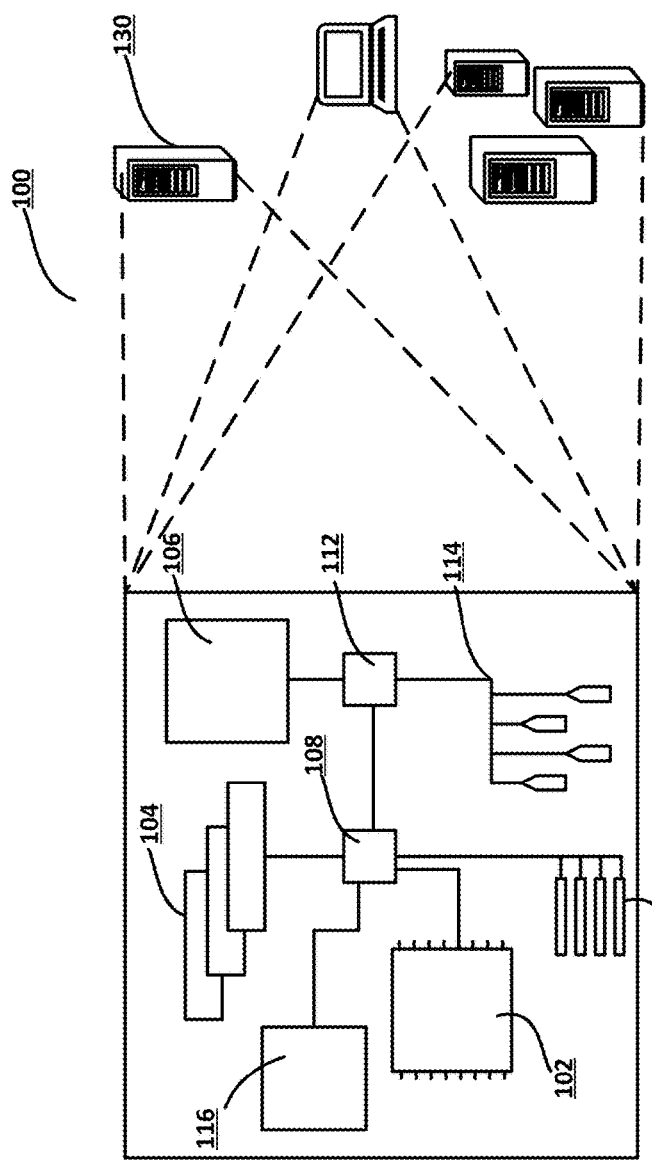
Figure 1:
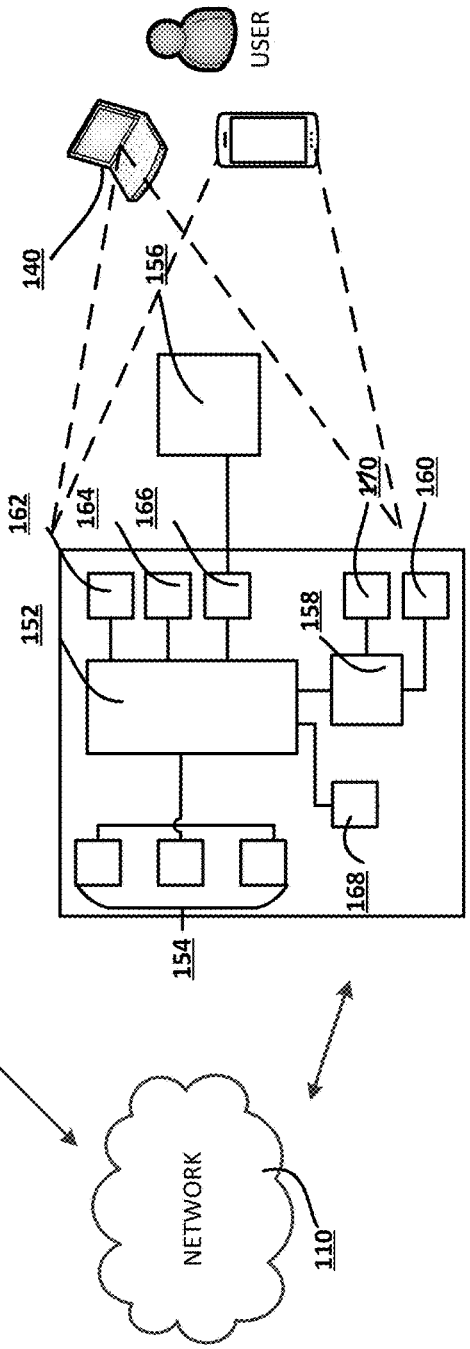
Figure 2:
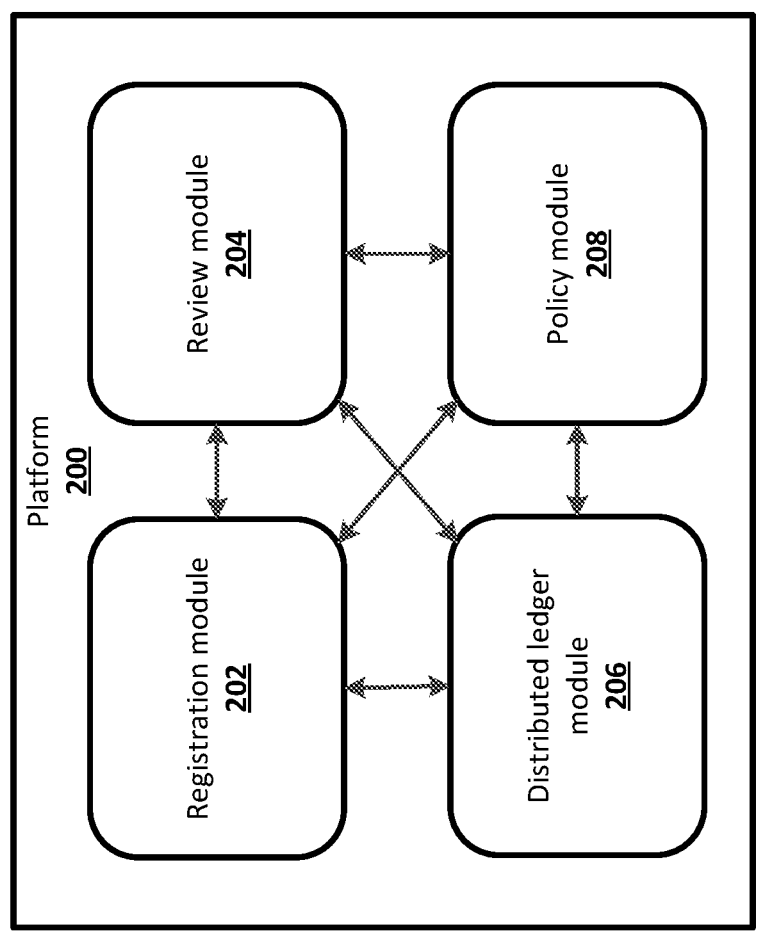
Figure 3:
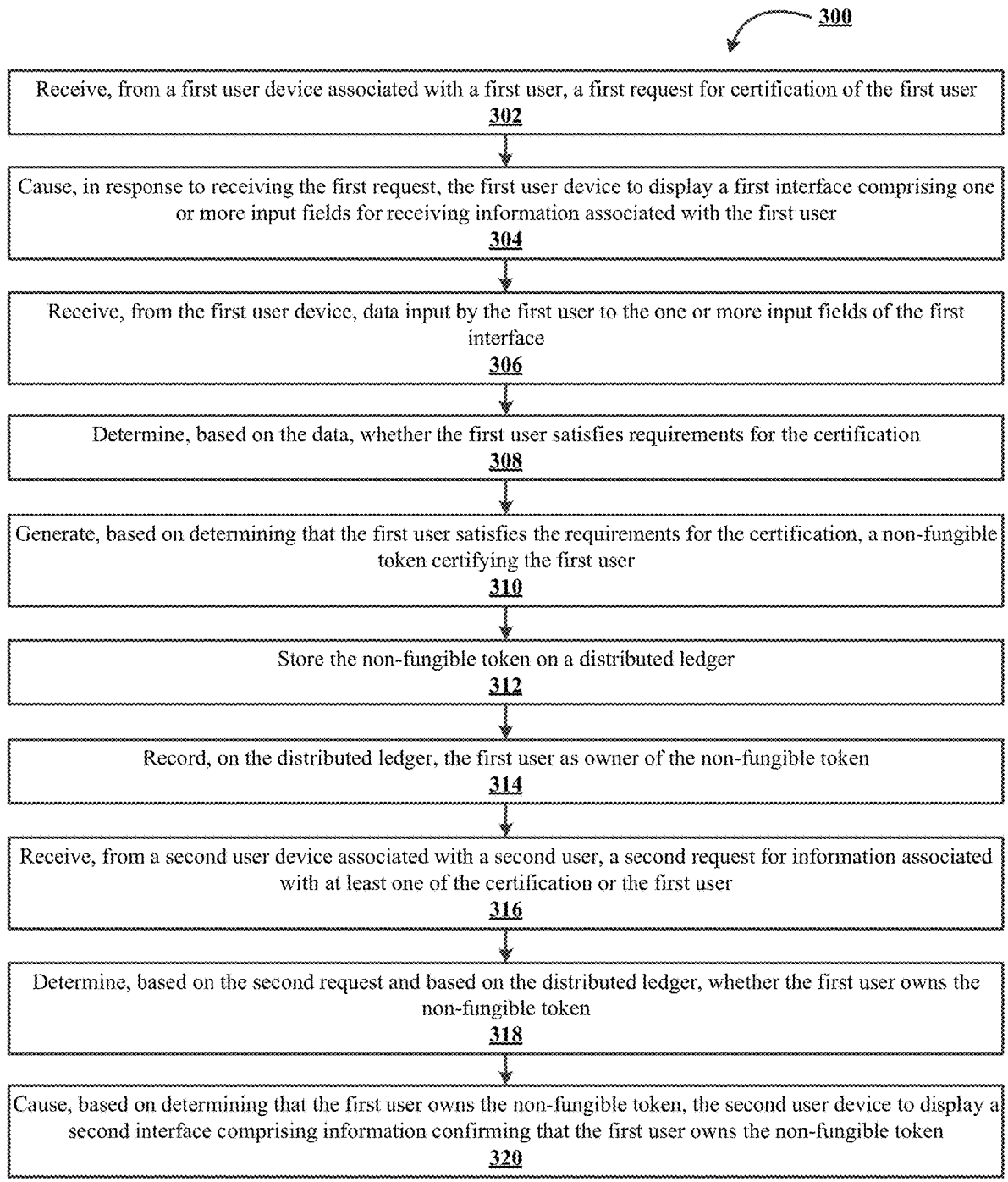

Having thus described embodiments of the invention in general terms, reference will now be made the accompanying drawings, wherein:

FIG. 1 illustrates technical components of a system for generating and monitoring digital certificate rights in a distributed network, in accordance with an embodiment of the invention;

FIG. 2 illustrates an exemplary platform for generating and monitoring digital certificate rights in a distributed network, in accordance with an embodiment of the invention; and FIG. 3 illustrates a process flow for generating and monitoring digital certificate rights in a distributed network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an electronic system may be configured to generate digital certificates for a plurality of users. The electronic system may be configured to monitor the rights of each user of the plurality of users to the digital certificates. The electronic system may be configured to, before initially granting a user a right to a digital certificate, determine whether the user has characteristics that satisfy one or more requirements to receive the digital certificate.

However, after initially granting the user the right to the digital certificate, the electronic system may not be capable of determining whether or not the user maintains the characteristics necessary to satisfy the requirements. Furthermore, after initially granting the user the right to the digital certificate, the electronic system may not be capable of preventing the user from transferring the right and/or the digital certificate to another user that does not have the characteristics necessary to satisfy the requirements.

Thus, users that do not have the characteristics necessary to satisfy the requirements may nevertheless maintain rights to digital certificates and may present those digital certificates to systems, entities, other users, and/or the like to obtain access to, manipulate, misappropriate, and/or the like systems and/or data. Permitting such users that do not have the characteristics necessary to satisfy the requirements to obtain access to, manipulate, misappropriate, and/or the like systems and/or data consumes computing resources (e.g., processing resources, memory resources, power resources, communication resources, and/or the like) and/or network resources. Additionally, detecting, repairing, rectifying, correcting, and/or notifying relevant authorities and/or users of such inappropriate access, manipulation, misappropriation, and/or the like further consumes computing resources (e.g., processing resources, memory resources, power resources, communication resources, and/or the like) and/or network resources.

Furthermore, the users that do not have the characteristics necessary to satisfy the requirements may present digital certificates to systems, entities, other users, and/or the like as evidence that the users do have the characteristics, such that the users may initiate interactions, resource distributions, and/or the like with the systems, the entities, the other users, and/or the like. Permitting such users that do not have the characteristics necessary to satisfy the requirements to deceive such systems, entities, other users, and/or the like into conducting interactions, resource distributions, and/or the like consumes computing resources (e.g., processing resources, memory resources, power resources, communication resources, and/or the like) and/or network resources. Additionally, detecting, repairing, rectifying, correcting, and/or notifying relevant authorities and/or users of such deceptively induced interactions, resource distributions, and/or the like further consumes computing resources (e.g., processing resources, memory resources, power resources, communication resources, and/or the like) and/or network resources.

Some embodiments described herein provide a system, a computer program product, and/or a method for generating and monitoring digital certificate rights in a distributed network. For example, a system (e.g., an electronic system for generating and monitoring digital certificate rights in a distributed network and/or the like) may be configured to generate non-fungible tokens (NFTs) to serve as a certification of trusted and/or verified characteristics of an entity and/or a user. For example, the system may receive information associated with an entity, such as proof of identity, source retainer identification numbers, proof of licensing and/or certifications, historical performance of services for other users, and/or the like. The system may attempt to verify some of the information by accessing financial systems and/or databases, online databases of user reviews, historical resource distribution data, and/or the like. The system may then determine whether the entity meets the requirements for a particular certification (e.g., based on various policy rules, which the system may manage), and, if so, generate an NFT for the entity, store the NFT on a distributed ledger, and record the entity's ownership of the NFT on the distributed ledger. The system may monitor whether the entity continues to meet the requirements for the certification over time and revoke and/or reinstate ownership of the NFT. When a potential user (e.g., another entity and/or a user) inquires about the entity and/or the certification, the system may verify the entity's ownership of the NFT via the distributed ledger and then display the entity's ownership of the NFT to the potential user.

By monitoring whether the entity continues to meet the requirements for the certification over time and revoking and/or reinstating ownership of the NFT, the system prevents the entity from using the NFT to inappropriately obtain access to, manipulate, misappropriate, and/or the like systems and/or data, which conserves computing resources (e.g., processing resources, memory resources, power resources, communication resources, and/or the like) and/or network resources. Furthermore, by recording, revoking, and/or reinstating ownership of the NFT on the distributed ledger, the system prevents the entity from impermissibly transferring the NFT to another entity and/or user that does not have the characteristics necessary to satisfy the requirements, which prevents the other entity and/or user from using the NFT to inappropriately obtain access to, manipulate, misappropriate, and/or the like systems and/or data, thereby conserving computing resources (e.g., processing resources, memory resources, power resources, communication resources, and/or the like) and/or network resources. By preventing such inappropriate access, the system also conserves computing resources (e.g., processing resources, memory resources, power resources, communication resources, and/or the like) and/or network resources that would otherwise be consumed by detecting, repairing, rectifying, correcting, and/or notifying relevant authorities and/or users of such inappropriate access, manipulation, misappropriation, and/or the like.

Additionally, by monitoring whether the entity continues to meet the requirements for the certification over time and revoking and/or reinstating ownership of the NFT, the system prevents the entity from using the NFT to deceptively initiate interactions, resource distributions, and/or the like with the systems, the entities, the other users, and/or the like, which conserves computing resources (e.g., processing resources, memory resources, power resources, communication resources, and/or the like) and/or network resources. Furthermore, by preventing such deceptively induced interactions, the system conserves computing resources (e.g., processing resources, memory resources, power resources, communication resources, and/or the like) and/or network resources that would otherwise be consumed by detecting, repairing, rectifying, correcting, and/or notifying relevant authorities and/or users of such deceptively induced interactions.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for generating and monitoring digital certificate rights in a distributed network within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for generating and monitoring digital certificate rights in a distributed network, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In some embodiments, the memory 104 may be a volatile memory unit or units, such as volatile random-access memory (RAM) having a cache area for the temporary storage of information. In some embodiments, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment 100 may include one or more certification management systems, entity systems, entity devices, user devices, and/or the like (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more certification management systems, entity systems, entity devices, user devices, and/or the like may perform one or more of the steps described herein with respect to the process flow described herein with respect to FIG. 3.

FIG. 2 illustrates an exemplary platform 200 for generating and monitoring digital certificate rights in a distributed network, in accordance with an embodiment of the invention. As shown in FIG. 2, the platform 200 may include a registration module 202, a review module 204, a distributed ledger module 206, and a policy module 208.

In some embodiments, the registration module 202 may include a user and/or entity registration element. Additionally, or alternatively, a user and/or an entity may, using the registration module 202, navigate to an interface, establish identity using one or more authentication mechanisms, and demonstrate satisfactory requirements to meet criteria for a particular NFT which the user and/or the entity is attempting to receive.

In some embodiments, the review module 204 may generate an interface with which other users may request and/or review current holders of NFTs. Additionally, or alternatively, the review module 204 may communicate with the distributed ledger module 206 to determine current holders of one or more NFTs.

In some embodiments, the distributed ledger module 206 may include a federated trusted server implementation of an NFT blockchain, whereby trusted authorities owned and/or managed by an authoritative system (e.g., owned and/or controlled by an entity) may issue and/or revoke NFTs to and/or from users and/or businesses. For example, the authoritative system may issue and/or revoke NFTs to and/or from users and/or businesses in response to registration requirements and/or shifting requirements.

In some embodiments, the policy module 208 may be a policy engine that includes various requirements and/or standards that a user and/or a business must meet in order for a trusted authority to determine that the user and/or the business is eligible to claim ownership of an NFT. For example, a requirement and/or a standard may include confirmation of a particular balance threshold in a source retainer (e.g., an account). As another example, a requirement and/or a standard may include a history of confirmed transactions of a required level and satisfaction. Additionally, or alternatively, the policy module 208 may also drive revocation decisions should any of these established requirements fail to be met at a future date. For example, the policy module 208 may determine that a user and/or an entity no longer satisfies a requirement and/or a standard that must be met to claim ownership of an NFT, and may revoke the NFT from the user and/or the entity by recording, via the distributed ledger module 206, a null owner as the owner of the NFT.

In some embodiments, the platform 200 may operate in a public manner such that a user and/or an entity may be able to use the platform 200 to identify the public identity (e.g., a user's name, an entity's name, and/or the like) of other users and/or other entities that own one or more NFTs. Additionally, or alternatively, the platform 200 may operate in an anonymous manner such that a user and/or an entity may not be able to use the platform 200 to identify public identities of other users and/or other entities, but may identify that another user and/or another entity owns one or more NFTs. For example, when operating in such an anonymous manner, the platform 200 may receive authentication information from a first user (e.g., identification of an NFT which the first user owns), validate the authentication information (e.g., using the distributed ledger module), receive a request for information associated with a certification for which the platform 200 issues NFTs, provide one or more anonymized identities of other users that own an NFT for the certification, and facilitate and/or provide communication between the first user and the other users without revealing the public identities of the first user and/or the other users.

In some embodiments, the platform 200 may include one or more certification management systems, entity systems, entity devices, user devices, and/or the like (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more certification management systems, entity systems, entity devices, user devices, and/or the like may perform one or more of the steps described herein with respect to the process flow described herein with respect to FIG. 3.

FIG. 3 illustrates a process flow 300 for generating and monitoring digital certificate rights in a distributed network, in accordance with an embodiment of the invention. In some embodiments, one or more certification management systems, entity systems, entity devices, user devices, and/or the like (e.g., similar to one or more of the systems described herein with respect to FIG. 1) may perform one or more of the steps of process flow 300.

As shown in block 302, the process flow 300 may include receiving, from a first user device associated with a first user, a first request for certification of the first user. For example, a certificate management system may receive, from a first user device associated with a first user, a first request for certification of the first user.

As shown in block 304, the process flow 300 may include causing, in response to receiving the first request, the first user device to display a first interface including one or more input fields for receiving information associated with the first user. For example, the certificate management system may cause, in response to receiving the first request, the first user device to display a first interface including one or more input fields for receiving information associated with the first user.

As shown in block 306, the process flow 300 may include receiving, from the first user device, data input by the first user to the one or more input fields of the first interface. For example, the certificate management system may receive, from the first user device, data input by the first user to the one or more input fields of the first interface.

As shown in block 308, the process flow 300 may include determining, based on the data, whether the first user satisfies requirements for the certification. For example, the certificate management system may determine, based on the data, whether the first user satisfies requirements for the certification.

As shown in block 310, the process flow 300 may include generating, based on determining that the first user satisfies the requirements for the certification, a non-fungible token certifying the first user. For example, the certificate management system may generate, based on determining that the first user satisfies the requirements for the certification, a non-fungible token certifying the first user.

As shown in block 312, the process flow 300 may include storing the non-fungible token on a distributed ledger. For example, the certificate management system may store the non-fungible token on a distributed ledger.

As shown in block 314, the process flow 300 may include recording, on the distributed ledger, the first user as owner of the non-fungible token. For example, the certificate management system may record, on the distributed ledger, the first user as owner of the non-fungible token. In some embodiments, the certificate management system may transmit one or more commands to another system managing the distributed ledger to record the first user as owner of the non-fungible token.

As shown in block 316, the process flow 300 may include receiving, from a second user device associated with a second user, a second request for information associated with at least one of the certification or the first user. For example, the certificate management system may receive, from a second user device associated with a second user, a second request for information associated with at least one of the certification or the first user.

As shown in block 318, the process flow 300 may include determining, based on the second request and based on the distributed ledger, whether the first user owns the non-fungible token. For example, the certificate management system may determine, based on the second request and based on the distributed ledger, whether the first user owns the non-fungible token.

As shown in block 320, the process flow 300 may include causing, based on determining that the first user owns the non-fungible token, the second user device to display a second interface including information confirming that the first user owns the non-fungible token. For example, the certificate management system may cause, based on determining that the first user owns the non-fungible token, the second user device to display a second interface including information confirming that the first user owns the non-fungible token Process flow 300 may include additional embodiments, such as any single embodiment or any combination of embodiments described below and/or in connection with one or more other processes described elsewhere herein.

In a first embodiment, the first user may be an entity.

In a second embodiment alone or in combination with the first embodiment, the first interface may request entry, in the one or more input fields, of information identifying a source retainer associated with the first user, information identifying a government-provided unique identifier associated with the first user, information identifying one or more services previously performed by the first user, information identifying one or more certifications held by the first user, information identifying one or more licenses from one or more regulatory agencies held by the first user, information identifying one or more accounts associated with the first user, where the one or more accounts are associated with ratings of the first user provided by other users, information identifying government-provided rating associated with the first user, and/or the like In a third embodiment alone or in combination with any of the first through second embodiments, the first interface may request entry, in the one or more input fields, of information identifying a source retainer associated with the first user, and the process flow 300 may include determining, based on the information identifying the source retainer and based on other data stored in a data structure, a balance of resources in the source retainer and, when determining whether the first user satisfies the requirements for the certification, determining whether the balance of the resources in the source retainer satisfies a threshold.

In a fourth embodiment alone or in combination with any of the first through third embodiments, the process flow 300 may include monitoring the balance of the resources in the source retainer over time to determine whether the balance of the resources in the source retainer satisfies the threshold and recording, on the distributed ledger and based on determining that the balance of the resources in the source retainer does not satisfy the threshold, a null owner as the owner of the non-fungible token.

In a fifth embodiment alone or in combination with any of the first through fourth embodiments, the process flow 300 may include, after recording the null owner as the owner of the non-fungible token, continuing to monitor the balance of the resources in the source retainer over time as compared to the threshold and recording, on the distributed ledger and based on determining that the balance of the resources in the source retainer does satisfy the threshold, the first user as the owner of the non-fungible token.

In a sixth embodiment alone or in combination with any of the first through fifth embodiments, the process flow 300 may include, after receiving the second request, determining, based on the information identifying the source retainer and based on the other data stored in the data structure, the balance of resources in the source retainer and recording, on the distributed ledger and based on determining that the balance of the resources in the source retainer does not satisfy the threshold, a null owner as the owner of the non-fungible token.

In a seventh embodiment alone or in combination with any of the first through sixth embodiments, the process flow 300 may include determining, based on other data in one or more data structures, whether the data is accurate and, when determining whether the first user satisfies the requirements for the certification, determining whether the first user satisfies the requirements for the certification based on determining that the data is accurate.

In an eighth embodiment alone or in combination with any of the first through seventh embodiments, the process flow 300 may include, when generating the non-fungible token certifying the first user, only generating the non-fungible token certifying the first user based on determining that the data is accurate.

In a ninth embodiment alone or in combination with any of the first through eighth embodiments, the second interface may include information confirming, for each requirement of the requirements for the certification, that the first user satisfies the requirement.

In a tenth embodiment alone or in combination with any of the first through ninth embodiments, the process flow 300 may include, when determining whether the first user satisfies the requirements for the certification, determining, based on the data and based on other data in a policy data structure, whether the first user satisfies the requirements for the certification, where the other data in the policy data structure includes records associating a plurality of users with a plurality of requirements for a plurality of certifications.

In an eleventh embodiment alone or in combination with any of the first through tenth embodiments, the other data in the policy data structure may include historical data indicating whether each user of the plurality of users has performed historical resource distributions satisfying a threshold, where the threshold includes a quantity of the historical resource distributions, a quantity of the historical resource distributions associated with a distribution of resources exceeding a predetermined amount, a rating from customers of the historical resource distributions, and/or the like.

In a twelfth embodiment alone or in combination with any of the first through eleventh embodiments, the process flow 300 may include monitoring the other data in the policy data structure over time to determine whether the first user satisfies the requirements for the certification and recording, on the distributed ledger and based on determining that the first user does not satisfy the requirements for the certification, a null owner as the owner of the non-fungible token.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for generating and monitoring non-fungible token (NFT) rights in a distributed network, the system comprising:
   at least one processing device; and
   at least one non-transitory storage device comprising computer-executable program code that, when executed by the at least one processing device, causes the at least one processing device to:
      receive, from a first user device associated with a first user, a first request for certification of the first user;
      cause, in response to receiving the first request, the first user device to display a first interface comprising one or more input fields for receiving information associated with the first user;
      receive, from the first user device, data input by the first user to the one or more input fields of the first interface;
      determine, based on the data, whether the first user satisfies requirements for the certification;

generate, based on determining that the first user satisfies the requirements for the certification, a non-fungible token certifying the first user;
store the non-fungible token on a distributed ledger;
record, on the distributed ledger, the first user as owner of the non-fungible token;
monitor the data over time to determine whether the first user satisfies the requirements for the certification;
record, on the distributed ledger and based on determining that the first user does not satisfy the requirements for the certification, a null owner as the owner of the non-fungible token to revoke ownership of the first user of the non-fungible token;
receive, from a second user device associated with a second user, a second request for information associated with at least one of the certification or the first user;
determine, based on the second request and based on the distributed ledger, whether the first user owns the non-fungible token; and
cause, based on determining that the first user owns the non-fungible token, the second user device to display a second interface comprising information confirming that the first user owns the non-fungible token.

2. The system of claim 1, wherein the first user is an entity.

3. The system of claim 1, wherein the first interface requests entry, in the one or more input fields, of at least one of:
information identifying a source retainer associated with the first user;
information identifying a government-provided unique identifier associated with the first user;
information identifying one or more services previously performed by the first user;
information identifying one or more certifications held by the first user;
information identifying one or more licenses from one or more regulatory agencies held by the first user;
information identifying one or more accounts associated with the first user, wherein the one or more accounts are associated with ratings of the first user provided by other users; or
information identifying government-provided rating associated with the first user.

4. The system of claim 1, wherein:
the first interface requests entry, in the one or more input fields, of information identifying a source retainer associated with the first user; and
the at least one non-transitory storage device comprises computer-executable program code that, when executed by the at least one processing device, causes the at least one processing device to:
determine, based on the information identifying the source retainer and based on other data stored in a data structure, a balance of resources in the source retainer; and
when determining whether the first user satisfies the requirements for the certification, determine whether the balance of the resources in the source retainer satisfies a threshold.

5. The system of claim 4, wherein the at least one non-transitory storage device comprises computer-executable program code that, when executed by the at least one processing device, causes the at least one processing device to:
monitor the balance of the resources in the source retainer over time to determine whether the balance of the resources in the source retainer satisfies the threshold; and
record, on the distributed ledger and based on determining that the balance of the resources in the source retainer does not satisfy the threshold, the null owner as the owner of the non-fungible token.

6. The system of claim 5, wherein the at least one non-transitory storage device comprises computer-executable program code that, when executed by the at least one processing device, causes the at least one processing device to:
after recording the null owner as the owner of the non-fungible token, continue to monitor the balance of the resources in the source retainer over time as compared to the threshold; and
record, on the distributed ledger and based on determining that the balance of the resources in the source retainer does satisfy the threshold, the first user as the owner of the non-fungible token.

7. The system of claim 4, wherein the at least one non-transitory storage device comprises computer-executable program code that, when executed by the at least one processing device, causes the at least one processing device to, after receiving the second request:
determine, based on the information identifying the source retainer and based on the other data stored in the data structure, the balance of resources in the source retainer; and
record, on the distributed ledger and based on determining that the balance of the resources in the source retainer does not satisfy the threshold, the null owner as the owner of the non-fungible token.

8. The system of claim 1, wherein the at least one non-transitory storage device comprises computer-executable program code that, when executed by the at least one processing device, causes the at least one processing device to:
determine, based on other data in one or more data structures, whether the data is accurate; and
when determining whether the first user satisfies the requirements for the certification, determine whether the first user satisfies the requirements for the certification based on determining that the data is accurate.

9. The system of claim 8, wherein the at least one non-transitory storage device comprises computer-executable program code that, when executed by the at least one processing device, causes the at least one processing device to, when generating the non-fungible token certifying the first user, only generate the non-fungible token certifying the first user based on determining that the data is accurate.

10. The system of claim 1, wherein the second interface comprises information confirming, for each requirement of the requirements for the certification, that the first user satisfies the requirement.

11. The system of claim 1, wherein the at least one non-transitory storage device comprises computer-executable program code that, when executed by the at least one processing device, causes the at least one processing device to, when determining whether the first user satisfies the requirements for the certification:
determine, based on the data and based on other data in a policy data structure, whether the first user satisfies the requirements for the certification, wherein the other data in the policy data structure comprises records associating a plurality of users with a plurality of requirements for a plurality of certifications.

12. The system of claim 11, wherein the other data in the policy data structure comprises historical data indicating whether each user of the plurality of users has performed historical resource distributions satisfying a threshold, wherein the threshold comprises at least one of:
   a quantity of the historical resource distributions;
   a quantity of the historical resource distributions associated with a distribution of resources exceeding a predetermined amount; or
   a rating from customers of the historical resource distributions.

13. The system of claim 11, wherein the at least one non-transitory storage device comprises computer-executable program code that, when executed by the at least one processing device, causes the at least one processing device to:
   monitor the other data in the policy data structure over time to determine whether the first user satisfies the requirements for the certification; and
   record, on the distributed ledger and based on determining that the first user does not satisfy the requirements for the certification, the null owner as the owner of the non-fungible token.

14. A computer program product for generating and monitoring non-fungible token (NFT) rights in a distributed network, the computer program product comprising a non-transitory computer-readable medium comprising code that, when executed by a first apparatus, causes the first apparatus to:
   receive, from a first user device associated with a first user, a first request for certification of the first user;
   cause, in response to receiving the first request, the first user device to display a first interface comprising one or more input fields for receiving information associated with the first user;
   receive, from the first user device, data input by the first user to the one or more input fields of the first interface;
   determine, based on the data, whether the first user satisfies requirements for the certification;
   generate, based on determining that the first user satisfies the requirements for the certification, a non-fungible token certifying the first user;
   store the non-fungible token on a distributed ledger;
   record, on the distributed ledger, the first user as owner of the non-fungible token;
   monitor the data over time to determine whether the first user satisfies the requirements for the certification;
   record, on the distributed ledger and based on determining that the first user does not satisfy the requirements for the certification, a null owner as the owner of the non-fungible token to revoke ownership of the first user of the non-fungible token;
   receive, from a second user device associated with a second user, a second request for information associated with at least one of the certification or the first user;
   determine, based on the second request and based on the distributed ledger, whether the first user owns the non-fungible token; and
   cause, based on determining that the first user owns the non-fungible token, the second user device to display a second interface comprising information confirming that the first user owns the non-fungible token.

15. The computer program product of claim 14, wherein the first user is an entity.

16. The computer program product of claim 14, wherein the first interface requests entry, in the one or more input fields, of at least one of:
   information identifying a source retainer associated with the first user;
   information identifying a government-provided unique identifier associated with the first user;
   information identifying one or more services previously performed by the first user;
   information identifying one or more certifications held by the first user;
   information identifying one or more licenses from one or more regulatory agencies held by the first user;
   information identifying one or more accounts associated with the first user, wherein the one or more accounts are associated with ratings of the first user provided by other users; or
   information identifying government-provided rating associated with the first user.

17. The computer program product of claim 14, wherein:
   the first interface requests entry, in the one or more input fields, of information identifying a source retainer associated with the first user; and
   the non-transitory computer-readable medium comprises code that, when executed by the first apparatus, causes the first apparatus to:
   determine, based on the information identifying the source retainer and based on other data stored in a data structure, a balance of resources in the source retainer; and
   when determining whether the first user satisfies the requirements for the certification, determine whether the balance of the resources in the source retainer satisfies a threshold.

18. The computer program product of claim 17, wherein the non-transitory computer-readable medium comprises code that, when executed by the first apparatus, causes the first apparatus to:
   monitor the balance of the resources in the source retainer over time to determine whether the balance of the resources in the source retainer satisfies the threshold; and
   record, on the distributed ledger and based on determining that the balance of the resources in the source retainer does not satisfy the threshold, the null owner as the owner of the non-fungible token.

19. The computer program product of claim 18, wherein the non-transitory computer-readable medium comprises code that, when executed by the first apparatus, causes the first apparatus to:
   after recording the null owner as the owner of the non-fungible token, continue to monitor the balance of the resources in the source retainer over time as compared to the threshold; and
   record, on the distributed ledger and based on determining that the balance of the resources in the source retainer does satisfy the threshold, the first user as the owner of the non-fungible token.

20. A method for generating and monitoring non-fungible token (NFT) rights in a distributed network, the method comprising:
   receiving, from a first user device associated with a first user, a first request for certification of the first user;
   causing, in response to receiving the first request, the first user device to display a first interface comprising one or more input fields for receiving information associated with the first user;

receiving, from the first user device, data input by the first user to the one or more input fields of the first interface;

determining, based on the data, whether the first user satisfies requirements for the certification;

generating, based on determining that the first user satisfies the requirements for the certification, a non-fungible token certifying the first user;

storing the non-fungible token on a distributed ledger;

recording, on the distributed ledger, the first user as owner of the non-fungible token;

monitoring the data over time to determine whether the first user satisfies the requirements for the certification;

recording, on the distributed ledger and based on determining that the first user does not satisfy the requirements for the certification, a null owner as the owner of the non-fungible token to revoke ownership of the first user of the non-fungible token;

receiving, from a second user device associated with a second user, a second request for information associated with at least one of the certification or the first user;

determining, based on the second request and based on the distributed ledger, whether the first user owns the non-fungible token; and causing, based on determining that the first user owns the non-fungible token, the second user device to display a second interface comprising information confirming that the first user owns the non-fungible token.

* * * * *